United States Patent [19]

Riddel

[11] 4,133,408
[45] Jan. 9, 1979

[54] FLOW AMPLIFIER VALVE ASSEMBLY
[75] Inventor: John W. Riddel, Fenton, Mich.
[73] Assignee: General Motors Corporation, Detroit, Mich.
[21] Appl. No.: 845,881
[22] Filed: Oct. 27, 1977
[51] Int. Cl.² .............................................. B60K 31/00
[52] U.S. Cl. ................................ 180/108; 123/103 R; 192/3 G
[58] Field of Search .................... 180/108; 123/103 R; 192/3 G

[56] References Cited
U.S. PATENT DOCUMENTS 3,999,622  12/1976  Reed ..................................... 180/108
4,082,158  4/1978  Carol, Jr. et al. .................... 180/108

Primary Examiner—Joseph F. Peters, Jr.
Assistant Examiner—Donn McGiehan
Attorney, Agent, or Firm—D. D. McGraw

[57] ABSTRACT

A vehicle vacuum operated road speed control system has a flow amplifier valve in the circuit. The system uses a very low flow controlled by a system control valve and applied to the amplifier valve. The amplifier valve receives vacuum directly from a vacuum source and provides an output to the vehicle road speed control servomotor which is proportional to the control flow but is at a much higher flow level. This leads to the improved system performance.

1 Claim, 2 Drawing Figures

FLOW AMPLIFIER VALVE ASSEMBLY

The invention relates to an amplifier valve assembly and more particularly to a flow amplifier valve of the type usable in a vehicle road speed control system having a source of vacuum, a vacuum operated power unit acting when energized to control engine speed and power to maintain a desired vehicle speed, an actual vehicle road speed sensor and a desired vehicle road speed sensor and generating a speed error signal therefrom, and a control valve operated in accordance with the speed error signal to admit atmospheric air therethrough in a controlled manner to generate a relatively low flow vacuum signal . . . which is delivered to the amplifier valve assembly. Improved system performance is obtained by use of the flow amplifier valve assembly of the invention in a cruise control system of the type described. There is less delay between the change in the speed error signal and in the power unit response so that the controller gain may be increased without instability, thereby reducing speed variations and decreasing lock-up error. With quicker lock-up response and less speed variation, the lead term can be eliminated which eliminates any amplification of speedometer cable drive gear wobble. Tolerances in the system are much less critical because of the higher controller gain available and the smaller flow through the control valve, as well as less control valve vacuum loading during operation.

The flow amplifier valve also functions as a vacuum feedback device. It essentially measures engine vacuum by flow in a fixed orifice and controls at a point where this flow is matched by flow at constant pressure in a variable orifice. Prior systems match flows in a fixed orifice at pressures ranging from about 1 to 2 inches of mercury. The variable orifice of the system can be a duty cycle valve such as that disclosed in U.S. Pat. No. 3,088,538, entitled, "Vehicle Warning and Cruise Control System" and issued May 7, 1963; or a transducer such as that disclosed in U.S. Pat. No. 3,419,105, entitled, "Vehicle Road Speed Control System" and issued Dec. 31, 1968, for example.

The flow amplifier valve of the invention also has a system stabilizing effect. The vacuum feedback effect causes a higher gain to be applied to break stiction than is applied to a moving throttle. This effect reduces or eliminates limit cycles caused by throttle or attaching cable friction.

IN THE DRAWINGS

Figure 1:
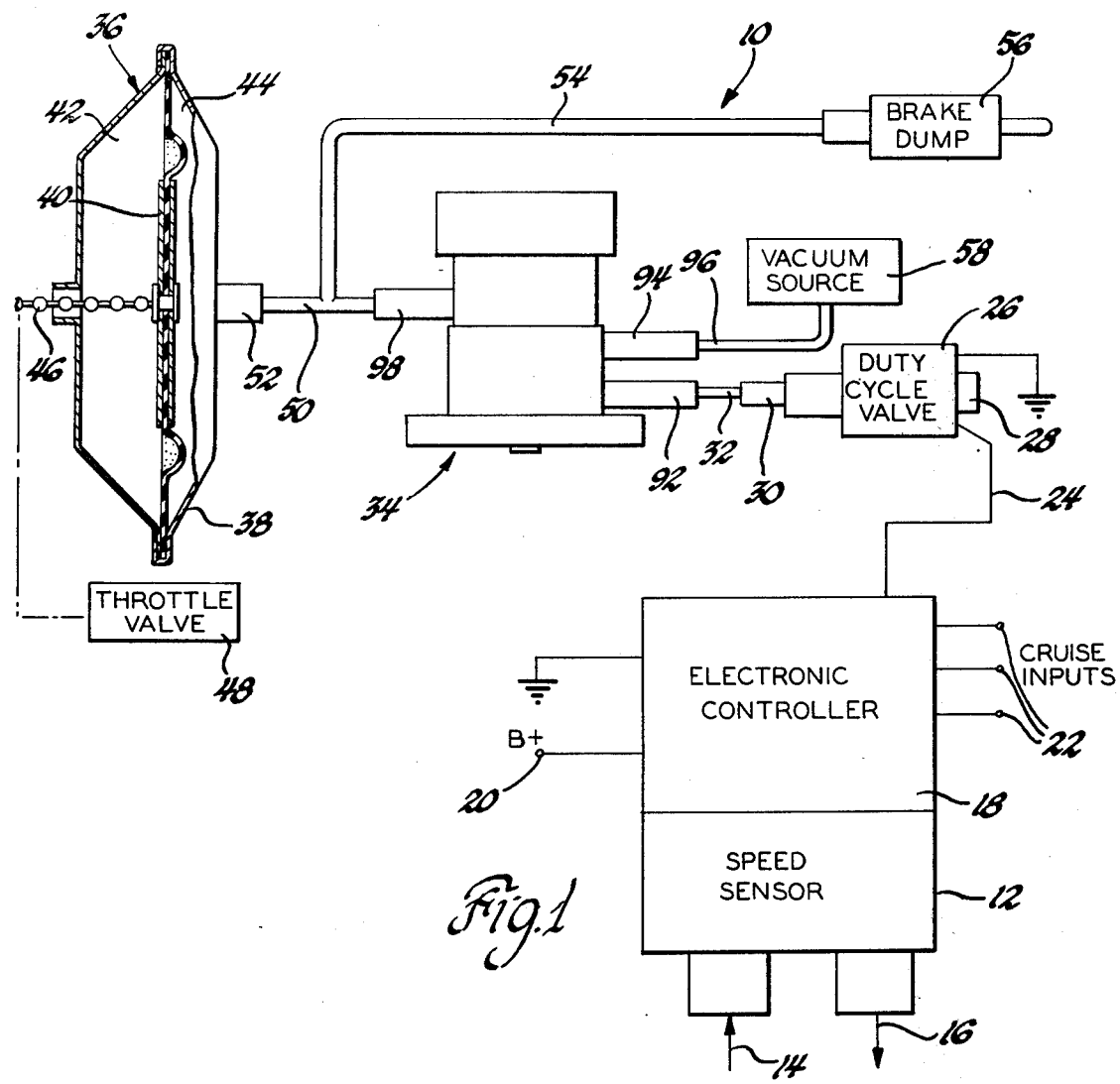
FIG. 1 is a schematic representation of a vehicle road speed control system embodying the invention, with parts broken away and in section.

The vehicle road speed control system 10 of FIG. 1 schematically illustrates a speed sensor 12 driven by a speedometer drive cable 14 from a suitable portion of the vehicle such as the transmission output shaft, and having an output drive cable 16 connected to drive the vehicle speedometer. The speed sensor is connected to an electronic controller 18. The controller has a source of electrical energy 20 and suitable cruise control inputs 22. The controller also receives a vehicle speed signal from the speed sensor 12. It generates a control signal in the controller output lead 24. The control signal may be a duty cycle signal if a duty cycle type mechanism such as that schematically illustrated is used. It may be a continuously variable speed error signal if a transducer is used of the type cited in the above noted U.S. Pat. No 3,419,105. Output lead 24 is connected to control valve 26, which is schematically identified as a duty cycle valve. The valve 26 has an atmospheric air inlet 28 and an outlet 30 connected to a conduit 32 leading to the amplifier valve assembly 34 embodying the invention.

The system 10 also has a power unit 36 which is illustrated as a diaphragm type servomotor composed of a housing 38 having a diaphragm type power wall 40 dividing the housing into an atmospheric pressure chamber 42 and a variable pressure chamber 44. An output member 46, illustrated as a pull chain, is suitably operatively connected to the vehicle engine throttle valve 48 to control that valve when the system is actuated. As is usual in systems of this type, the output member 46 is capable of only exerting an opening pull on the throttle valve against the force of the throttle valve closing spring.

A conduit 50 is connected to a port 52 of the servomotor so that the pressure in conduit 50 is communicated with chamber 44 of the power unit. A conduit 54, branching from conduit 50, is connected to a normally closed valve 56. Valve 56 when open admits atmospheric pressure into conduit 54 and therefore into chamber 44 through conduit 50 and port 52. Valve 56 is arranged to be opened when the vehicle brakes are applied. It is also common to arrange to deactuate the electronic controller 18 when the brakes are applied. This may be done by suitable structure well known in the art and not shown in the drawing. A vacuum source 58 provides the subatmospheric pressure for operation of the entire system. It is connected as will be described below when describing the amplifier valve assembly 34 in detail.

Valve assembly 34 has an axially extending housing 60 provided with an opening 62 in one end 64 which is suitably connected to atmospheric pressure. In the particular construction illustrated, the cap 65 holds an air filter 66 in position so that the atmospheric air from atmospheric air inlet 68 is filtered before it enters opening 62. The other end 70 of housing 60 is closed by a diaphragm 72 which forms a movable wall. The diaphragm includes a diaphragm plate 74, and is held in position on housing 60 by a retainer 76.

A divider wall 78 is positioned in housing 60 intermediate the housing ends 64 and 70 so that it divides the housing interior into a diaphragm chamber 80 and a valve chamber 82. The divider wall 78 has a first passage 84 formed axially therein and extending axially of the housing. One end 86 of passage 84 opens into diaphragm chamber 80. The other end 88 of passage 84 opens into valve chamber 82. Divider wall 78 has a second passage 90 extending transversely of the divider wall and intersecting passage 84.

Housing 60 has a first port 92 which is connected to the diaphragm chamber 80 and also is connected to conduit 32 of the system shown in FIG. 1. Housing 60 has a second port 94 connecting the divider wall passage 90 to a conduit 96 which is connected to the vacuum source 58. The vacuum source may be the intake manifold of the vehicle engine, or some other suitable source. Housing 60 has a third port 98 which connects the valve chamber 82 to conduit 50 and therefore to the power unit variable pressure chamber 44. The portion of divider wall 78 adjacent passage end 88 defines a valve seat 100. Similarly, a portion of housing 60 surrounding opening 62 defines a valve seat 102.

Figure 2:
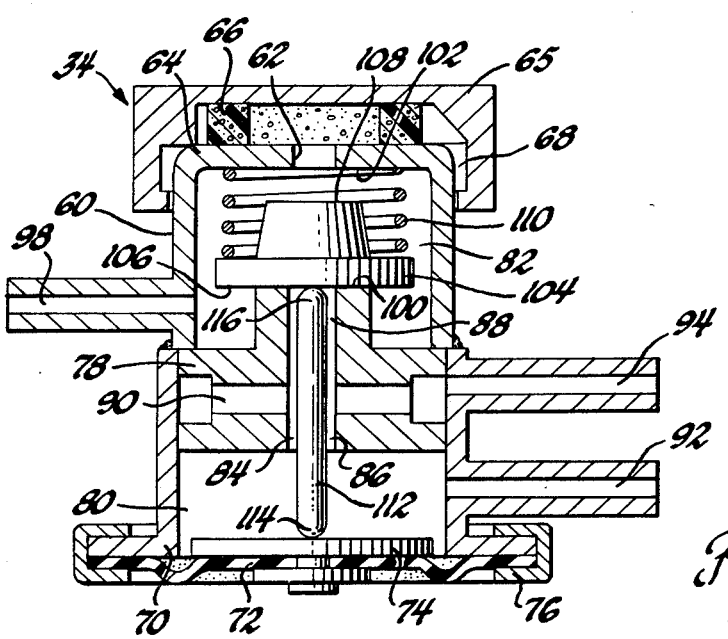
FIG. 2 is a cross section view of the amplifier valve assembly embodying the invention and shown as a part of the system of FIG. 1.

An amplifier valve 104 is contained in valve chamber 82. Valve 104 has a valve surface 106 which is cooperable with valve seat 100, and a valve surface 108 which is cooperable with valve seat 102. A valve spring 110 is contained in valve chamber 82 and continually urges valve 104 toward valve seat 100. Valve surface 106 is shown in FIG. 2 as being in engagement with valve seat 100 so that the passage end 88 of first passage 84 is closed. Under this condition, valve surface 108 is spaced from valve seat 102 so that valve chamber 82 is open to atmosphere through opening 62 and atmospheric air inlet 68.

A drive pin 112 is positioned to extend through passage 84 and has one end 114 engaging the diaphragm plate 74. The other end 116 of pin 112 engages valve surface 106 of amplifier valve 104. The drive pin is somewhat smaller in diameter than passage 84 so that air flow can occur through passage 84 to and from either or both of chambers 80 and 82 when the passage ends 86 and/or 88 are open.

The amplifier valve assembly 34 is illustrated in FIG. 2 in the inactive position. When the vehicle road speed control system 10 is actuated, electronic controller 18 generates a control signal in its output lead 24 which causes control valve 26 to operate. In operation, control valve 26 restricts the amount of atmospheric air capable of entering air inlet 28, causing a decrease in absolute pressure to occur in diaphragm chamber 80. This can be done on a proportional basis as a duty cycle valve or on a continuous modulating basis when another type of transducer is utilized. The pressure differential established across the diaphragm movable wall 72 causes that wall to move against drive pin 112, thereby moving the drive pin toward housing opening 62. The differential pressure across diaphragm 72 will be sufficient to move the drive pin 112 and the amplifier valve 104 against the force of valve spring 110, opening end 88 of passage 84 to the valve chamber 82 and then closing the housing atmospheric air opening 62 by moving valve surface 108 into engagement with valve seat 102. A decreased absolute pressure is therefore transmitted from the vacuum source 58 through passage 90 and passage 84 and passage end 88 to the valve chamber 82 and then to the power unit variable pressure chamber 44 through port 98, conduit 50 and port 52. The road speed control system 10 is therefore actuated and the power unit 36 controls the vehicle road speed by controlling the position of the vehicle engine throttle valve 48. The control valve 26 will control the amplifier valve assembly 34 with a relatively low flow through conduit 32 and port 92, and the amplifier valve assembly will provide an output pressure to the power unit through port 98 which is proportional to the output pressure in port 92 from the control valve but at an amplified flow level.

What is claimed is:

1. In a vehicle road speed control system having a source of vacuum, a vacuum operated power unit acting when energized to control engine speed and power to maintain a desired vehicle road speed, means sensing actual vehicle road speed and desired vehicle road speed and generating a duty cycle signal therefrom, and a duty cycle control valve operated in accordance with said signal to be open to admit atmospheric air therethrough at 0% duty cycle and to be fully closed at 100% duty cycle, the improvement comprising:

an amplifier valve assembly comprising:
an axially extending housing having an opening to atmospheric air at one end, a diaphragm forming a movable wall closing the other housing end, and a divider wall in said housing intermediate said housing ends to divide the housing interior into a diaphragm chamber and a valve chamber;
said divider wall having a first passage therein extending axially of said housing and opening into said chambers at its opposite ends, and a second passage extending transversely of said divider wall and intersecting said first passage;
said housing having a first port connecting said diaphragm chamber and the output side of said duty cycle control valve, a second port connecting said divider wall second passage to said source of vacuum, and a third port connecting said valve chamber to said power unit to selectively provide variable subatmospheric pressure to one side of said power unit;
an amplifier valve in said valve chamber having spring means urging the amplifier valve to close the end of said first passage opening into said valve chamber, said amplifier valve being movable axially of said housing against the force of said spring means to open said first passage end and close said housing atmospheric air opening;
and a drive pin extending through said divider wall first passage with circumferential clearance relative thereto to provide restrictive flow areas between said chambers and said second passage, said drive pin having one end engaging said movable wall and the other end engaging said amplifier valve, said drive pin being movable by said wall against the force of said amplifier valve spring means to force said amplifier valve to open said first passage end opening into said valve chamber;
the initiation of duty cycle operation of said duty cycle control valve in accordance with said signal causing a decrease in absolute pressure in said diaphragm chamber and a pressure differential across said movable wall to move said movable wall and said drive pin to move said amplifier valve to open said first passage one end to said valve chamber and close said housing atmospheric air opening, admitting a decreased absolute pressure from said vacuum source through said second and first passages to said valve chamber and then to said power unit through said third port, actuating said system, said duty cycle control valve controlling the amplifier valve assembly to provide an output to said power unit which is proportional to the output from said duty cycle control valve but at an amplified flow level.

* * * * *